United States Patent
Yumoto

(10) Patent No.: US 10,516,848 B2
(45) Date of Patent: Dec. 24, 2019

(54) IMAGE PROCESSING DEVICE

(71) Applicant: PANASONIC INTELLECTUAL PROPERTY MANAGEMENT CO., LTD., Osaka (JP)

(72) Inventor: Hiroshi Yumoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/088,582

(22) PCT Filed: Mar. 9, 2017

(86) PCT No.: PCT/JP2017/009409
§ 371 (c)(1),
(2) Date: Sep. 26, 2018

(87) PCT Pub. No.: WO2017/169614
PCT Pub. Date: Oct. 5, 2017

(65) Prior Publication Data
US 2019/0124292 A1    Apr. 25, 2019

(30) Foreign Application Priority Data

Mar. 29, 2016   (JP) .................. 2016-066197

(51) Int. Cl.
*H04N 7/01*      (2006.01)
*B60R 1/00*      (2006.01)
(Continued)

(52) U.S. Cl.
CPC ............ *H04N 7/0127* (2013.01); *B60R 1/00* (2013.01); *B60R 1/12* (2013.01); *G06K 9/00791* (2013.01);
(Continued)

(58) Field of Classification Search
CPC ..... B60R 1/00; B60R 1/12; B60R 2001/1215; B60R 2300/8066; B60R 2300/70;
(Continued)

(56) References Cited

U.S. PATENT DOCUMENTS 8,229,623 B2 *  7/2012  Maki .................... G07C 5/0891
                                                    348/148
2002/0047900 A1 *  4/2002  Nishiyama ............... H04N 7/18
                                                    348/148
(Continued)

FOREIGN PATENT DOCUMENTS

JP        2003-259354       9/2003

OTHER PUBLICATIONS

International Search Report (ISR) from International Searching Authority (Japan Patent Office) in International Pat. Appl. No. PCT/JP2017/009409, dated May 30, 2017.

*Primary Examiner* — Nathnael Aynalem
(74) *Attorney, Agent, or Firm* — Greenblum & Bernstein, P.L.C.

(57) ABSTRACT

An image processing device includes a frame memory, an image input unit, an image quality converter that converts, on a frame basis, image quality of image information stored in the frame memory, an image output unit that reads the image information from the frame memory and outputs the image information to a display device, a controller that controls a function of the image quality converter based on a traveling state of the vehicle and changes a frame delay amount from when each of frames of the image information is received until when the frame is outputted from the image output unit, and an interpolation frame setting unit that sets an interpolation frame of the image information to be outputted in a transition period in which the controller (Continued)

changes the frame delay amount from a first frame delay amount to a second frame delay amount.

7 Claims, 15 Drawing Sheets

(51) Int. Cl.
  *H04N 5/232* (2006.01)
  *B60R 1/12* (2006.01)
  *H04N 5/91* (2006.01)
  *G06K 9/00* (2006.01)

(52) U.S. Cl.
  CPC ........... *H04N 5/23218* (2018.08); *H04N 5/91* (2013.01); *H04N 7/0135* (2013.01); *B60R 2001/1215* (2013.01); *B60R 2300/8066* (2013.01); *G06K 2209/23* (2013.01)

(58) Field of Classification Search
  CPC .......... B60R 2300/80; B60R 2300/802; B60R 11/04; H04N 5/23218; H04N 5/91; H04N 7/0127; H04N 7/0135; H04N 7/18; H04N 7/181; H04N 2001/1215; G06K 9/00778; G06K 9/00785; G06K 9/00791; G06K 9/00798; G06K 9/00805; G06K 9/00812; G06K 9/00818; G06K 9/00825; G06K 9/00845; G06K 9/325; G06K 2209/15; G06T 2207/30236; G06T 2207/30248; G06T 2207/30252; G06T 2207/30256; G06T 2207/30261; G06T 2207/30264; G06T 2207/30268; G08G 1/16; G08G 1/116; B60W 50/14; B60W 2050/143; B60W 2550/10; B60W 2550/14; B60K 2370/176; B60K 2370/1868; B60K 2370/21; B60K 2370/52; B60K 2370/797; B60K 35/00
  USPC ........................................................ 348/148
  See application file for complete search history.

(56) References Cited

U.S. PATENT DOCUMENTS

| | | | |
|---|---|---|---|
| 2003/0169902 A1* | 9/2003 | Satoh | G06T 1/00 382/104 |
| 2017/0132476 A1* | 5/2017 | Chien | G06K 9/00791 |
| 2017/0291550 A1* | 10/2017 | Sasaguchi | B60R 1/00 |

* cited by examiner

IMAGE PROCESSING DEVICE

This application is a U.S. national stage application of the PCT International Application No. PCT/JP2017/009409 filed on Mar. 9, 2017, which claims the benefit of foreign priority of Japanese patent application 2016-066197 filed on Mar. 29, 2016, the contents all of which are incorporated herein by reference.

TECHNICAL FIELD

The present disclosure relates to an on-board image processing device that displays a captured image of a surrounding of a vehicle.

BACKGROUND ART

An electronic mirror device in which an on-board camera and a display are combined is recently put into practical use, and expected as a substitute for a rearview mirror (a vehicle interior rearview mirror such as a windshield rearview mirror) and a side mirror (including a vehicle exterior rearview mirror such as a door mirror). In the electronic mirror device, surroundings of the vehicle are imaged by the on-board camera, and a captured image is displayed on the display.

In the conventional windshield rearview mirror, sometimes visibility is interrupted by a passenger on a rear seat or baggage. On the other hand, in the electronic mirror device, a rear view of the vehicle is imaged by the on-board camera installed in a rear portion of the vehicle, so that the rear view can be checked without the viewing field being interrupted. While the side mirror comes easily into contact with an obstacle or a pedestrian because the side mirror is disposed such that it protrudes from the vehicle, the side mirror can be eliminated by applying the electronic mirror device. Currently, standardization of the electronic mirror device led by Europe has started in full-scale.

Typically, in the electronic mirror device, a signal (hereinafter, referred to as an image signal) indicating an image captured by the on-board camera is input to an image processing device, subjected to, for example, high-image quality processing including distortion correction processing, view angle conversion processing (rotation and scaling of the image), and noise reduction processing, and output to the display. Consequently, a high quality image can be displayed on the display. For example, PTL 1 discloses an on-board image processing device applicable to, for example, the electronic mirror device.

CITATION LIST

Patent Literature

PTL 1: Unexamined Japanese Patent Publication No. 2003-259354

SUMMARY OF THE INVENTION

However, in the image processing device of PTL 1, high-image quality processing is performed using a frame memory, so that a delay for several frames is generated since an image signal is input from the on-board camera until the image corresponding to the image signal is displayed on the display. In the high-image quality processing, high-speed operation is typically performed in an integrated circuit called SoC (System-on-a-Chip), and a frame delay amount caused by internal processing tends to increase in association with complication of a function. Thus, in the electronic mirror device, although the frame delay is unavoidable, a driver cannot accurately recognize a rear situation (an approaching situation of a following vehicle) when image quality is emphasized too much to increase the frame delay amount, which results in that safety may be damaged.

For example, in the case that the following vehicle is faster than an own vehicle to approach the own vehicle, the following vehicle recognized from the image displayed on the display is viewed farther away than an actual traveling position. For this reason, irrespective of an enough time in driving operation (for example, a lane change) under consciousness of the driver, improper driving operation is possibly performed in a situation in which actually the own vehicle is significantly close to the following vehicle. In particular, in the case that the vehicle travels at a high speed, considerable attention is required because a traveling position of the following vehicle recognized from the display image is largely different from an actual traveling position.

An object of the present disclosure is to provide an image processing device that can improve safety in the case that the image processing device is applied to the electronic mirror device and the like for displaying the captured image of a surrounding of the vehicle.

According to one aspect of the present disclosure, an image processing device includes: a frame memory in which image information is stored on a frame basis; an image input unit that receives and stores the image information about a captured image of a surrounding of a traveling vehicle in the frame memory; an image quality converter that converts, on a frame basis, image quality of the image information stored in the frame memory; an image output unit that reads the image information from the frame memory and outputs the image information to a display device; a controller that controls a function of the image quality converter based on a traveling state of the vehicle and changes a frame delay amount from when each of frames of the image information is received until when the frame is outputted from the image output unit; and an interpolation frame setting unit that sets an interpolation frame of the image information to be outputted in a transition period in which the controller changes the frame delay amount from a first frame delay amount to a second frame delay amount. The image output unit outputs a frame of the image information having the second frame delay amount after outputting the image information about the interpolation frame in the transition period.

According to the present disclosure, the frame delay amount corresponding to the input of the output image is changed based on the traveling state of the vehicle, so that the safety is specially improved in the case that the image processing device is applied to the electronic mirror device and the like for displaying the captured image of a surrounding of the vehicle.

DESCRIPTION OF EMBODIMENTS

Hereinafter, exemplary embodiments of the present disclosure will be detailed in detail with reference to the drawings.

First Exemplary Embodiment

Figure 1:
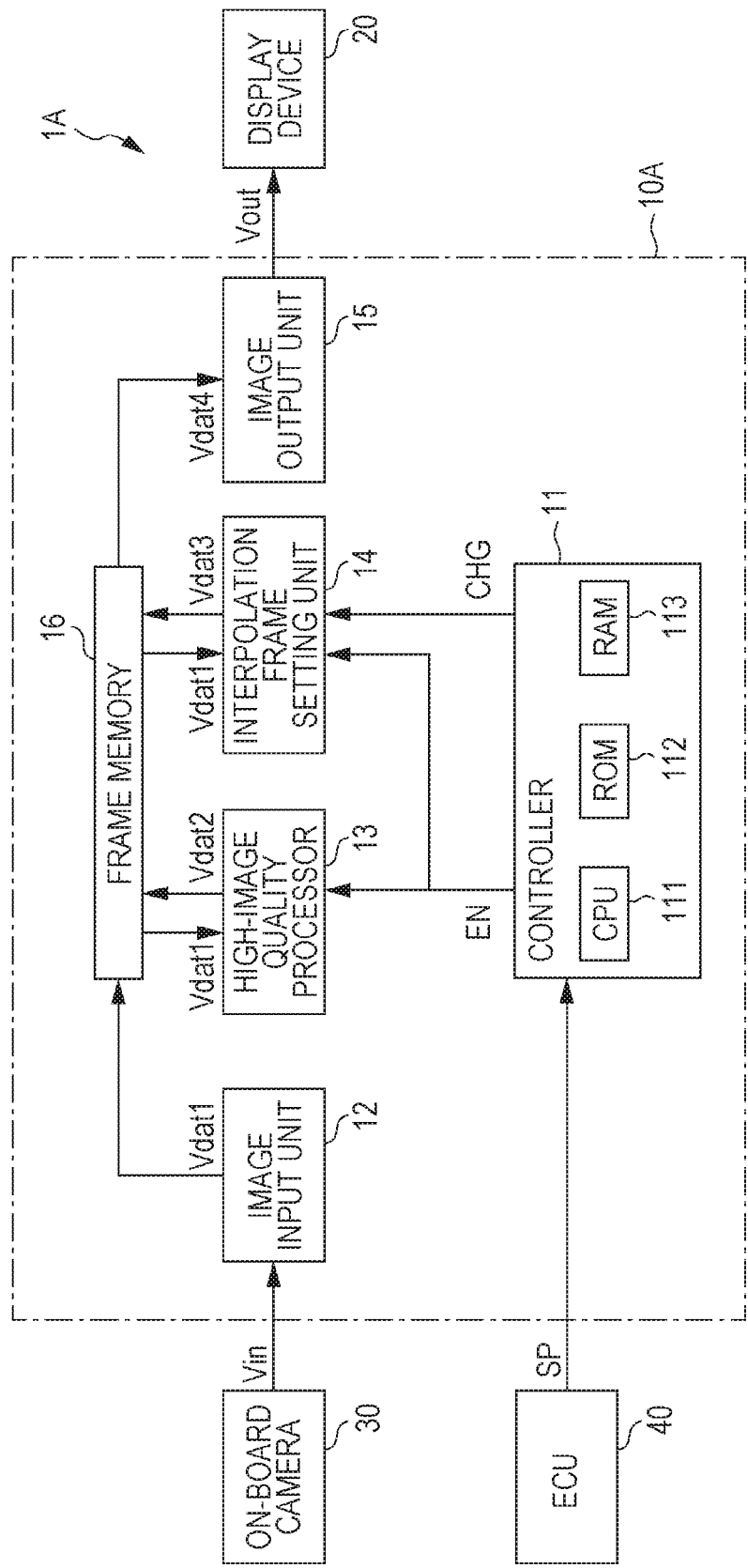
FIG. 1 is a block diagram illustrating an electronic mirror device to which an image processing device according to a first exemplary embodiment is applied.

FIG. 1 is a block diagram illustrating electronic mirror device 1A to which image processing device 10A according to a first exemplary embodiment is applied. As illustrated in FIG. 1, electronic mirror device 1A includes image processing device 10A, display device 20, and on-board camera 30. Electronic control unit (ECU) 40 is a computer that performs drive system control of a vehicle. Electronic mirror device 1A is communicably connected to ECU 40 to acquire speed information SP generated by ECU 40. For example, electronic mirror device 1A is used instead of a windshield rearview mirror or a side mirror.

Figure 4:
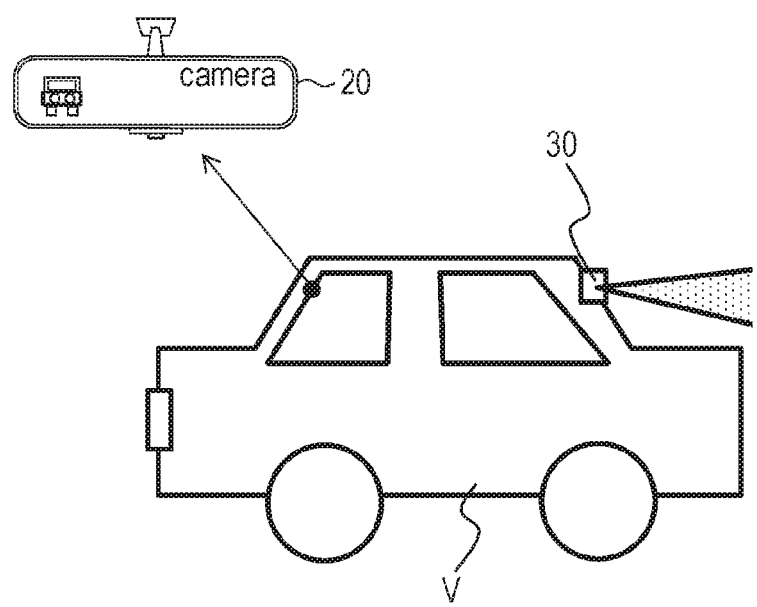
FIG. 4 is a view illustrating installation states of a display device and an on-board camera.

For example, on-board camera 30 is disposed on a rear glass of vehicle V (see FIG. 4). On-board camera 30 includes an optical element such as a lens and an imaging element such as a charge-coupled device (CCD) image sensor or a complementary metal oxide semiconductor (CMOS) image sensor. The optical element forms an image of received light on the imaging element. The imaging element converts an optical image formed by the optical element into an electric signal (RGB signal). On-board camera 30 transmits input image signal Vin based on the RGB signal generated by the imaging element to image processing device 10A by wireless communication or wired communication. For example, input image signal Vin is a YUV signal (for example, YUV422) in which the RGB signal is converted into luminance signal Y and two color difference signals UV. Input image signal Vin may be the RGB signal.

For example, display device 20 is a liquid crystal display including a display panel and a backlight (not illustrated), and is attached to a center in an upper portion of a windshield in a vehicle interior (see FIG. 4). Display device 20 displays an image based on output image signal Vout from image processing device 10A. An organic electroluminescence (EL) display may be applied to display device 20.

Image processing device 10A includes, for example, controller 11, image input unit 12, high-image quality processor 13 (image quality converter), interpolation frame setting unit 14, image output unit 15, and frame memory 16.

In image processing device 10A, high-image quality processing is performed using frame memory 16, so that a delay for several frames is generated since an image signal is input from on-board camera 30 until an image corresponding to the image signal is displayed on display device 20. In the case that a function of high-image quality processor 13 is validated, image quality is improved while a frame delay amount increases as compared with the case that a function of high-image quality processor 13 is invalidated.

Controller 11 includes central processing unit (CPU) 111, read only memory (ROM) 112, and random access memory (RAM) 113. CPU 111 reads a program from ROM 112 according to a processing content, develops the program in RAM 113, and convergently controls operation of each block of image processing device 10A in conjunction with the developed program.

In the first exemplary embodiment, CPU 111 analyzes speed information SP acquired from ECU 40, and outputs enable signal EN to high-image quality processor 13 and interpolation frame setting unit 14. Enable signal EN is a control signal indicating whether the function of high-image quality processor 13 is validated or invalidated. Change signal CHG is a control signal notifying interpolation frame setting unit 14 that a setting value of enable signal EN is changed, namely, the validation and invalidation of the function of high-image quality processor 13 are changed. Enable signal EN and change signal CHG are used in changing the validation and invalidation of the function of high-image quality processor 13 according to a vehicle speed.

Specifically, CPU 111 sets enable signal EN to "1" to validate the function of high-image quality processor 13 during an initial setting immediately after activation of electronic mirror device 1A and during low-speed traveling (for example, a vehicle speed is less than 80 km/h). That is, in the case that the vehicle travels at a low speed less than 80 km/h, it can be considered that the safety can be secured even if display timing of the captured image of a surrounding of the vehicle is slightly delayed, so that image processing is performed while the image quality is emphasized.

On the other hand, CPU 111 sets enable signal EN to "0" to invalidate the function of high-image quality processor 13 during high-speed traveling (for example, a vehicle speed is greater than or equal to 80 km/h). That is, in the case that the vehicle travels at a high speed of 80 km/h or more, the safety is lowered with an increasing frame delay amount, so that the image processing is performed while real-time property is emphasized. For the high-speed traveling, it is conceivable that the driver does not gaze the image to a degree in which a difference of the image quality can be recognized, so that it is considered that the driver has no complaint about degradation of the image quality.

In the case that enable signal EN is changed from "1" to "0", or in the case that enable signal EN is changed from "0" to "1", CPU 111 sets change signal CHG to "1", and causes interpolation frame setting unit 14 to perform processing.

A transition period in which the high-image quality display transitions to the low-image quality display and a transition period in which the low-image quality display transitions to the high-image quality display are previously set.

Image input unit 12 generates and outputs first image information Vdat1 (for example, YUV420) based on input image signal Vin from on-board camera 30. First image information Vdat1 is stored in frame memory 16. For example, input image signal Vin has a frame rate of 60 fps.

High-image quality processor 13 converts the image quality in a frame unit with respect to first image information Vdat1 stored in frame memory 16. Specifically, high-image quality processor 13 performs high-image quality processing including, for example, image distortion correction, view angle conversion, and noise reduction on first image information Vdat1 based on enable signal EN from controller 11, and outputs second image information Vdat2 having high-image quality. High-image quality processor 13 performs the high-image quality processing in the case that enable signal EN from controller 11 is set to "1", and high-image quality processor 13 does not perform the high-image quality processing in the case that enable signal EN is set to "0". Second image information Vdat2 is stored in frame memory 16.

Interpolation frame setting unit 14 sets an interpolation frame output in the transition period based on enable signal EN and change signal CHG from controller 11 in the case that the high-image quality display is changed to the low-image quality display or in the case that the low-image quality display is changed to the high-image quality display. Specifically, in the case that enable signal EN is determined to be changed from "1" to "0", namely, in the case that the low-speed traveling is changed to the high-speed traveling, interpolation frame setting unit 14 sets the interpolation frame output in the transition period in order to transition smoothly to the low-image quality display based on input enable signal EN and change signal CHG. In the case that enable signal EN is changed from "0" to "1", namely, in the case that the high-speed traveling is changed to the low-speed traveling, interpolation frame setting unit 14 sets the interpolation frame output in the transition period in order to transition smoothly to the high-image quality display. Image information Vdat3 (hereinafter, referred to as third image information Vdat3) about the interpolation frame is stored in frame memory 16. (The plurality of pieces of) third image information Vdat3 may be selected from first image information Vdat1 stored in frame memory 16, or third image information Vdat3 may newly be generated based on first image information Vdat1.

Image output unit 15 reads one of first image information Vdat1, second image information Vdat2, and third image information Vdat3, which are stored in frame memory 16, as output image information Vdat4, converts it into an RGB form, and outputs it as output image signal Vout.

As described above, output image information Vdat4 output as output image signal Vout is changed based on the signal of controller 11.

Specifically, image output unit 15 reads second image information Vdat2 having high-image quality as output image information Vdat4 for the low-speed traveling, and reads first image information Vdat1 having low-image quality for the high-speed traveling. Image output unit 15 reads third image information Vdat3 in the transition period in which the vehicle speed changes to change the high-image quality display to the low-image quality display and the transition period in which the low-image quality display is changed to the high-image quality display. Output image signal Vout is input to display device 20. The image captured by on-board camera 30 is displayed on display device 20 with a slight frame delay.

Frame memory 16 stores the image captured by on-board camera 30 in a frame unit. Frame memory 16 includes an area where at least a plurality (for example, for five frames) of pieces of first image information Vdat1 are stored, an area where second image information Vdat2 for one frame is stored, and an area where third image information Vdat3 for one frame is stored.

Figure 2:
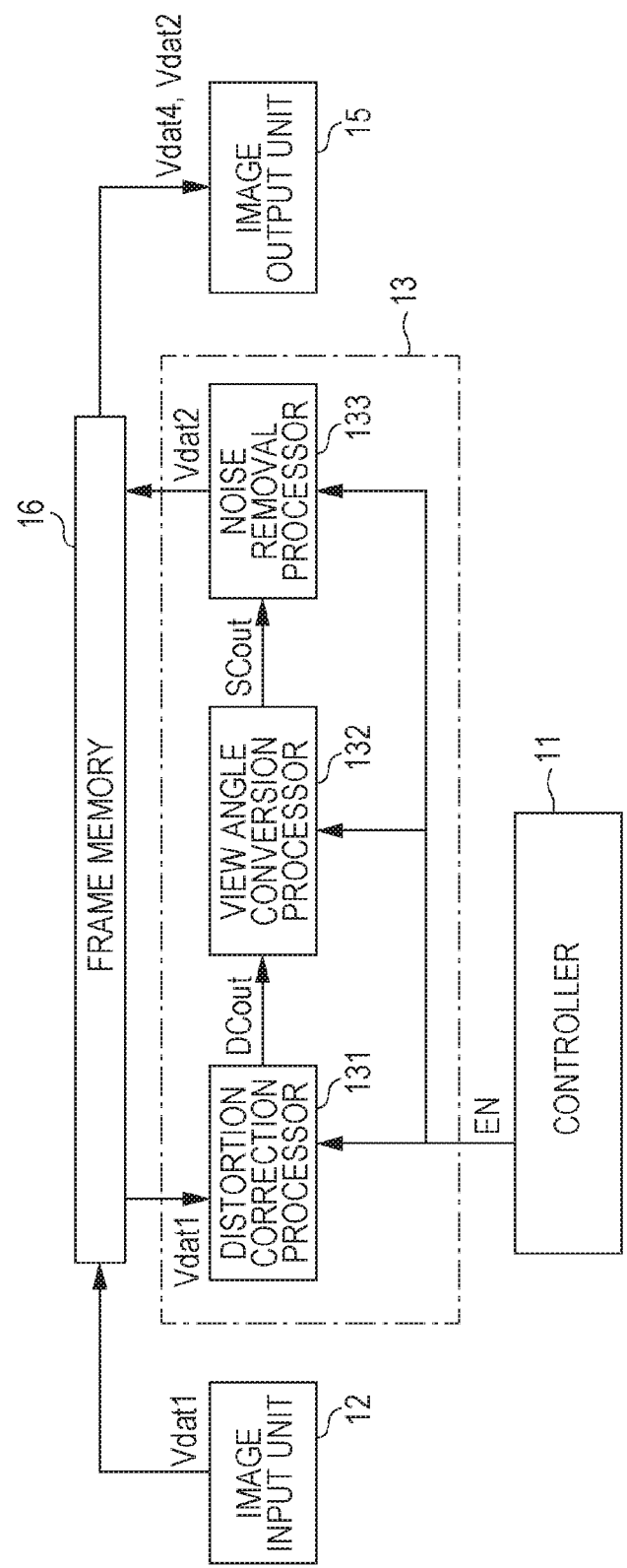
FIG. 2 is a block diagram illustrating an example of a high-image quality processor.

FIG. 2 is a block diagram illustrating an example of high-image quality processor 13. As illustrated in FIG. 2, high-image quality processor 13 includes distortion correction processor 131, view angle conversion processor 132, and noise removal processor 133.

High-image quality processor 13 may include an image quality processor that is mainly used in in a digital camera, such as a shake correction unit that corrects a shake of on-board camera 30 or a stain removal unit that removes lens stain, or may include an image quality processor that is mainly used in a television, such as a super-resolution processor or a storage color correction unit. The frame delay amount of the output image increases with increasing image quality processing performed by high-image quality processor 13.

Distortion correction processor 131 removes an image distortion component caused by a characteristic of the on-board camera with respect to first image information Vdat1 stored in frame memory 16, and outputs first intermediate information DCout. First intermediate information DCout is input to view angle conversion processor 132. Distortion correction processor 131 is validated in the case that enable signal EN is set to "1". Distortion correction processor 131 performs the distortion correction processing in a frame unit, so that a processing delay for one frame is generated during the distortion correction processing.

View angle conversion processor 132 cuts out any area for camera aiming with respect to first intermediate information DCout from distortion correction processor 131, rotates and enlarges or reduces the cut-out image, and outputs second intermediate information SCout. Second intermediate information SCout is input to noise removal processor 133. View angle conversion processor 132 is validated in the case that enable signal EN is set to "1". View angle conversion processor 132 performs the view angle conversion processing in a frame unit, so that the processing delay for one frame is generated during the view angle conversion processing.

Noise removal processor 133 has what is called a frame circulation type noise reduction function. Noise removal processor 133 removes a random noise by performing filtering in a time direction on second intermediate information SCout from view angle conversion processor 132, and outputs second image information Vdat2. Second image information Vdat2 is stored in frame memory 16. Noise removal processor 133 is validated in the case that enable signal EN is set to "1". Noise removal processor 133 performs the noise removal processing in a frame unit, so that a processing delay for one frame is generated during the noise removal processing.

Figure 3:
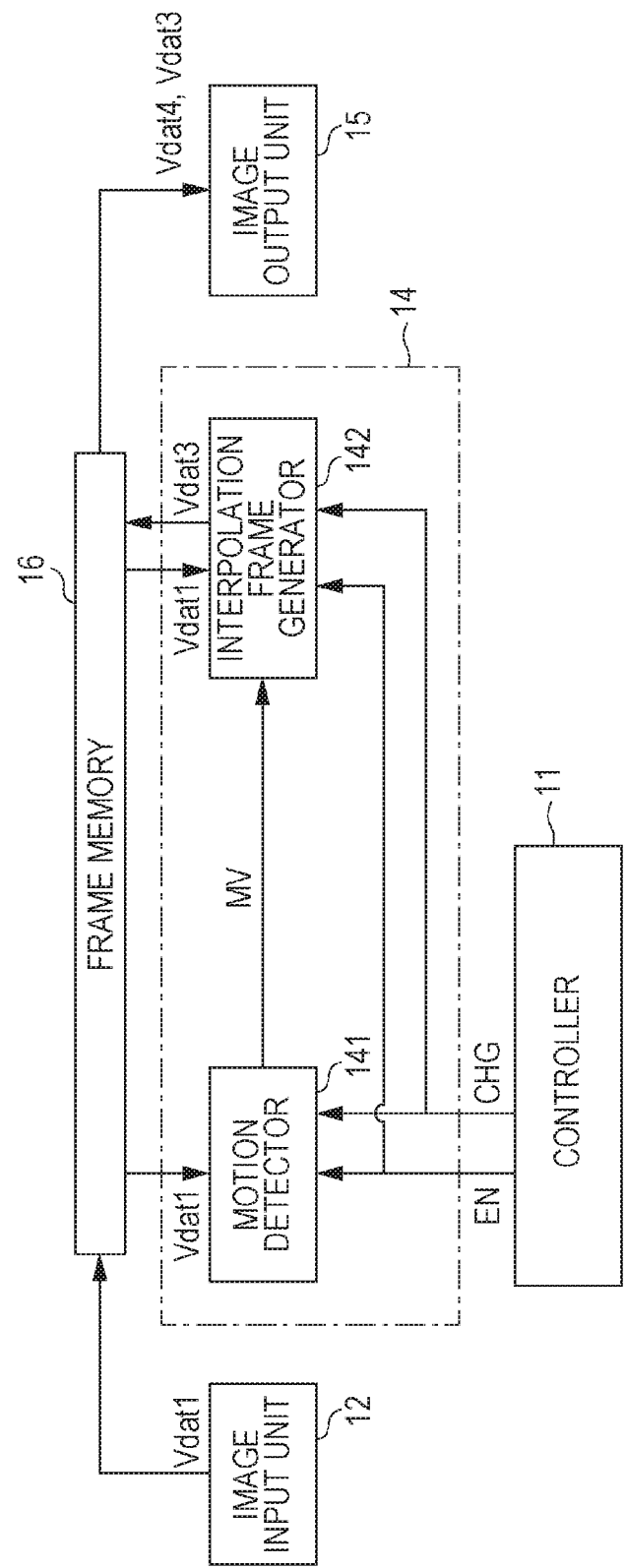
FIG. 3 is a block diagram illustrating an example of an interpolation frame setting unit.

FIG. 3 is a block diagram illustrating an example of interpolation frame setting unit 14. As illustrated in FIG. 3, interpolation frame setting unit 14 includes motion detector 141 and interpolation frame generator 142. Motion detector 141 and interpolation frame generator 142 are validated in the case that the change signal is set to "1".

Motion detector 141 detects motion between a plurality of consecutive frames based on first image information Vdat1 stored in frame memory 16, and outputs motion vector information MV to interpolation frame generator 142. Motion detector 141 calculates motion vector information MV by performing block matching frequently used in MPEG (Moving Picture Experts Group) coding on, for example, two consecutive pieces of first image information Vdat1 stored in frame memory 16.

Figure 5:
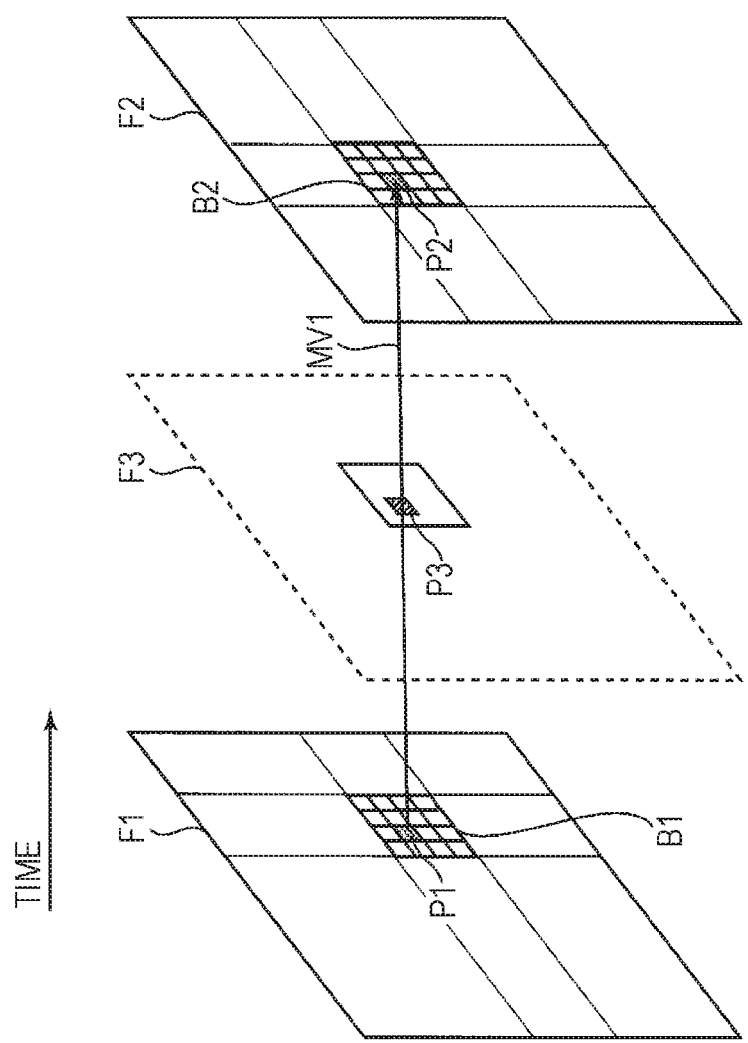
FIG. 5 is a view illustrating generation of an interpolation frame by block matching.

As illustrated in FIG. 5, in the block matching, preceding frame F1 and subsequent frame F2 are first divided into a plurality of image blocks (for example, 16-by-16 block). Then, attention is paid to one image block B1 (hereinafter, referred to as a "specific block") in preceding frame F1, an absolute value of a difference in pixel value between corresponding pixels is calculated with respect to all the pixels (for example, 16-by-16 pixel) in the block between specific block B1 and any image block of subsequent frame F2, and calculates a value in which the absolute value is accumulated (SAD: Sum of Absolute Difference). This processing is performed between specific block B1 of preceding frame F1 and all the image blocks of subsequent frame F2. Image block B2 having the minimum value of SAD becomes the image block (hereinafter, referred to as "similar block B2") having the highest correlation with specific block B1 of preceding frame F1 among all the image blocks of subsequent frame F2. A difference in position between specific block B1 of preceding frame F1 and similar block B2 of subsequent frame F2 is detected as motion vector MV1 for specific block B1. Motion vector information MV includes a motion vector detected in each of all the image blocks of preceding frame F1.

Interpolation frame generator 142 generates third image information Vdat3 that becomes the interpolation frame based on first image information Vdat1 and motion vector information MV, and stores third image information Vdat3 in frame memory 16. Interpolation frame generator 142 generates the interpolation frame (third image information Vdat3) by averaging two consecutive frames (first image information Vdat1) using, for example, motion vector information MV. As illustrated in FIG. 5, a pixel value of pixel P3 in interpolation frame F3 is generated through processing of adding a pixel value of corresponding pixel P1 in preceding frame F1 and a pixel value of corresponding pixel P2 in subsequent frame F2 and dividing the sum by 2. According to the generated motion vectors, a pixel to which a pixel value is not assigned in interpolation frame F3 is set with a pixel value obtained based on pixel values of peripheral pixels whose pixel values are assigned.

Figure 6:
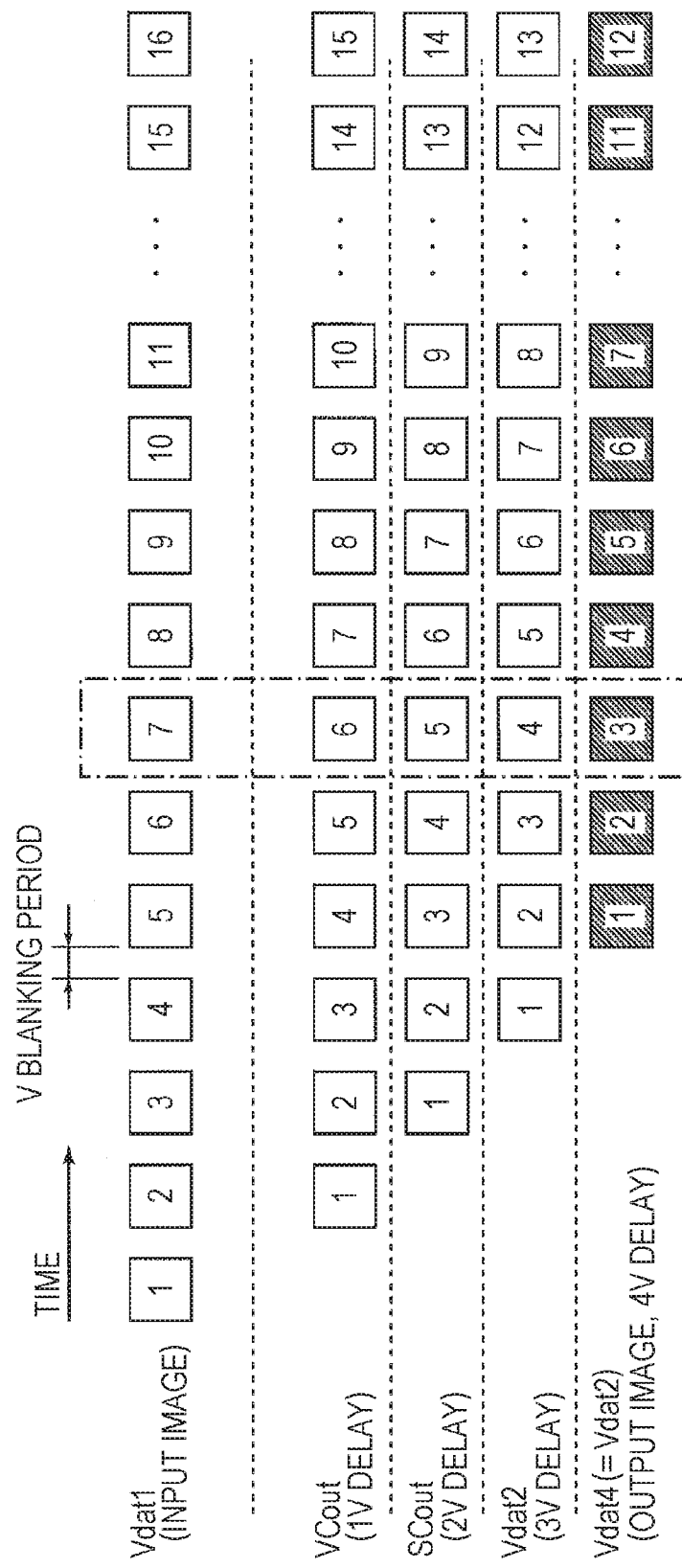
FIG. 6 is a view illustrating a relationship between an input image and an output image when high-image quality display is performed.

As described above, the frame delay for three frames is generated when high-image quality processor 13 performs the image quality processing. Thus, as illustrated in FIG. 6, the output image corresponding to the input image is displayed in timing of the 4-frame delay since the reception of the input image. For example, as illustrated by alternate long and short dash line in FIG. 6, frame #3 subjected to the high-image quality processing is displayed on display device 20 when frame #7 is input. On the other hand, as illustrated in FIG. 7, the output image corresponding to the input image is displayed in timing of the 1-frame delay since the reception of the input image in the case that the function of high-image quality processor 13 is invalidated.

Figure 7:
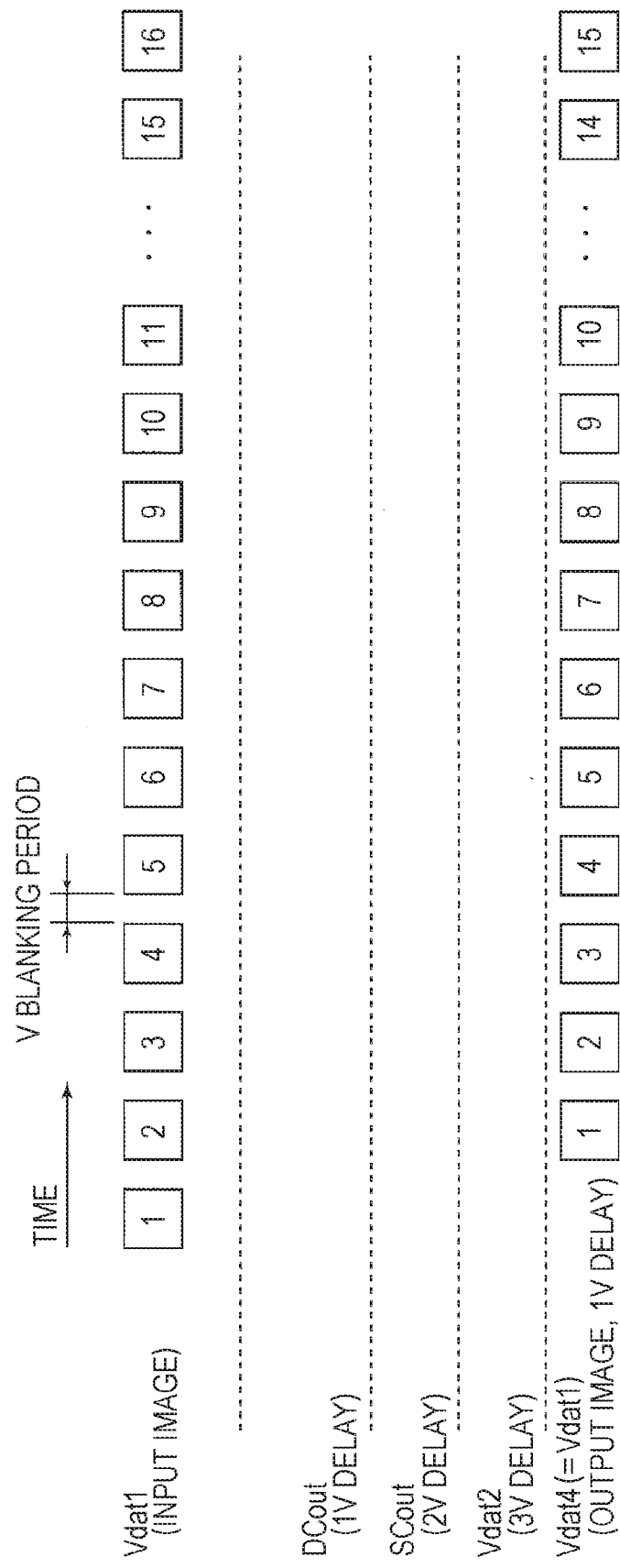
FIG. 7 is a view illustrating the relationship between the input image and the output image when low-image quality display is performed.

In the output image of FIGS. 6 and 7, the frame hatched in FIG. 6 indicates the frame (that is, second image information Vdat2) subject to the high-image quality processing, and the frame that is not hatched indicates the frame (that is, first image information Vdat1) that is not subjected to the high-image quality processing. In FIGS. 6 and 7, the 1-frame delay, the 2-frame delay, . . . are written as a 1V delay, a 2V delay, . . . .

Figure 8:
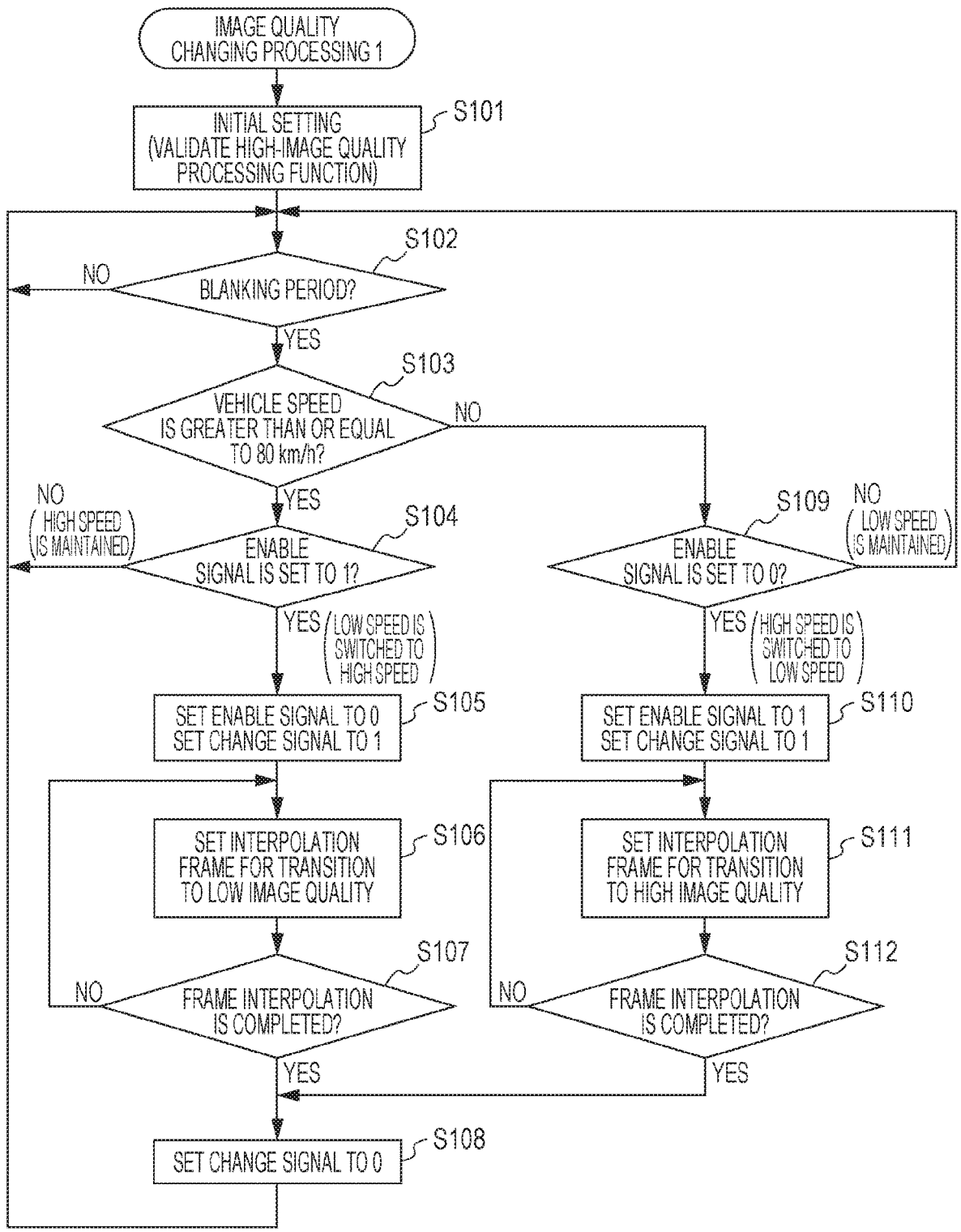
FIG. 8 is a flowchart illustrating an example of image quality changing processing in the first exemplary embodiment.

FIG. 8 is a flowchart illustrating an example of image quality changing processing in image processing device 10A. For example, CPU 111 calls an image processing program stored in ROM 112 and executes the image processing program, in association with the activation of electronic mirror device 1A, thereby performing the image quality changing processing. It is assumed that speed information SP is always input from ECU 40 to controller 11.

In step S101, controller 11 performs the initial setting of high-image quality processor 13. Specifically, controller 11 sets enable signal EN to "1" to validate the function of high-image quality processor 13 (distortion correction processor 131, view angle conversion processor 132, and noise removal processor 133). A high-image quality output image (second image information Vdat2) is displayed on display device 20 with a 4-frame delay (see FIG. 6).

In step S102, controller 11 determines whether first image information Vdat1 is in a V blanking period (see FIG. 6). When first image information Vdat1 is in the V blanking period (YES in step S102), the flowchart transitions to the processing in step S103. That is, the pieces of processing from step S103 are performed in timing when the frame is updated.

In step S103, controller 11 determines whether the vehicle speed is greater than or equal to 80 km/h based on speed information SP from ECU 40. When the vehicle speed is greater than or equal to 80 km/h (YES in step S103), the flowchart transitions to the processing in step S104. When the vehicle speed is less than 80 km/h (NO in step S103), the flowchart transitions to the processing in step S109.

In step S104, controller 11 determines whether enable signal EN is set to "1", namely, whether high-image quality processor 13 is validated. When enable signal EN is set to "1" to validate high-image quality processor 13 (YES in step S104), the low-speed traveling is changed to the high-speed traveling. In this case, the flowchart transitions to the processing in step S105 to perform the processing of smoothly changing the output image from the high image quality (4-frame delay) to the low image quality (1-frame delay). When enable signal EN is set to "0" to invalidate high-image quality processor 13 (NO in step S104), the high-speed traveling is maintained. In this case, the flowchart transitions to the processing in step S102 to continue the display of the low-image quality output image (first image information Vdat1).

In step S105, controller 11 sets change signal CHG to "1" while setting enable signal EN to "0". Consequently high-image quality processor 13 is invalidated, and interpolation frame setting unit 14 is validated.

At this point, continuity between the frames is damaged when the output image is instantaneously changed from the high image quality (the 4-frame delay in FIG. 6) to the low image quality (the 1-frame delay in FIG. 7). For example, in FIG. 6, high-image quality frame #2 (4-frame delay) is displayed when frame #6 is input. In the case that the low-speed traveling is changed to the high-speed traveling in timing of inputting frame #7 (in the V blanking period between frames #6 and #7), three frames of frames #3 to #5 are lacked when the low-image quality frame #6 (1-frame delay) is displayed. For this reason, unnatural display is performed to possibly give an uncomfortable feeling to the driver. Accordingly, the pieces of processing from step S106 are performed such that the output image is smoothly changed.

In step S106, controller 11 controls interpolation frame setting unit 14 to set the interpolation frame for transitioning to the low image quality (third image information Vdat3). Interpolation frame setting unit 14 sets an interpolation frame displayed in a transition period.

In step S107, controller 11 determines whether frame interpolation processing for the transition is completed. This determination processing is performed based on whether the previously-set transition period elapses, for example. The setting of the interpolation frame is continued until the frame interpolation processing for the transition is completed. In the transition period, third image information Vdat3 that is image information about the interpolation frame is read as output image information Vdat4, and displayed on display device 20.

When the frame interpolation processing is completed (YES in step S107), the flowchart transitions to the processing in step S108.

In step S108, controller 11 sets change signal CHG to "0" to invalidate interpolation frame setting unit 14, and transitions to the processing in step S102. From the subsequent frame, first image information Vdat1 of the 1-frame delay is read as output image information Vdat4, and the low-image quality image is displayed.

Figure 9:
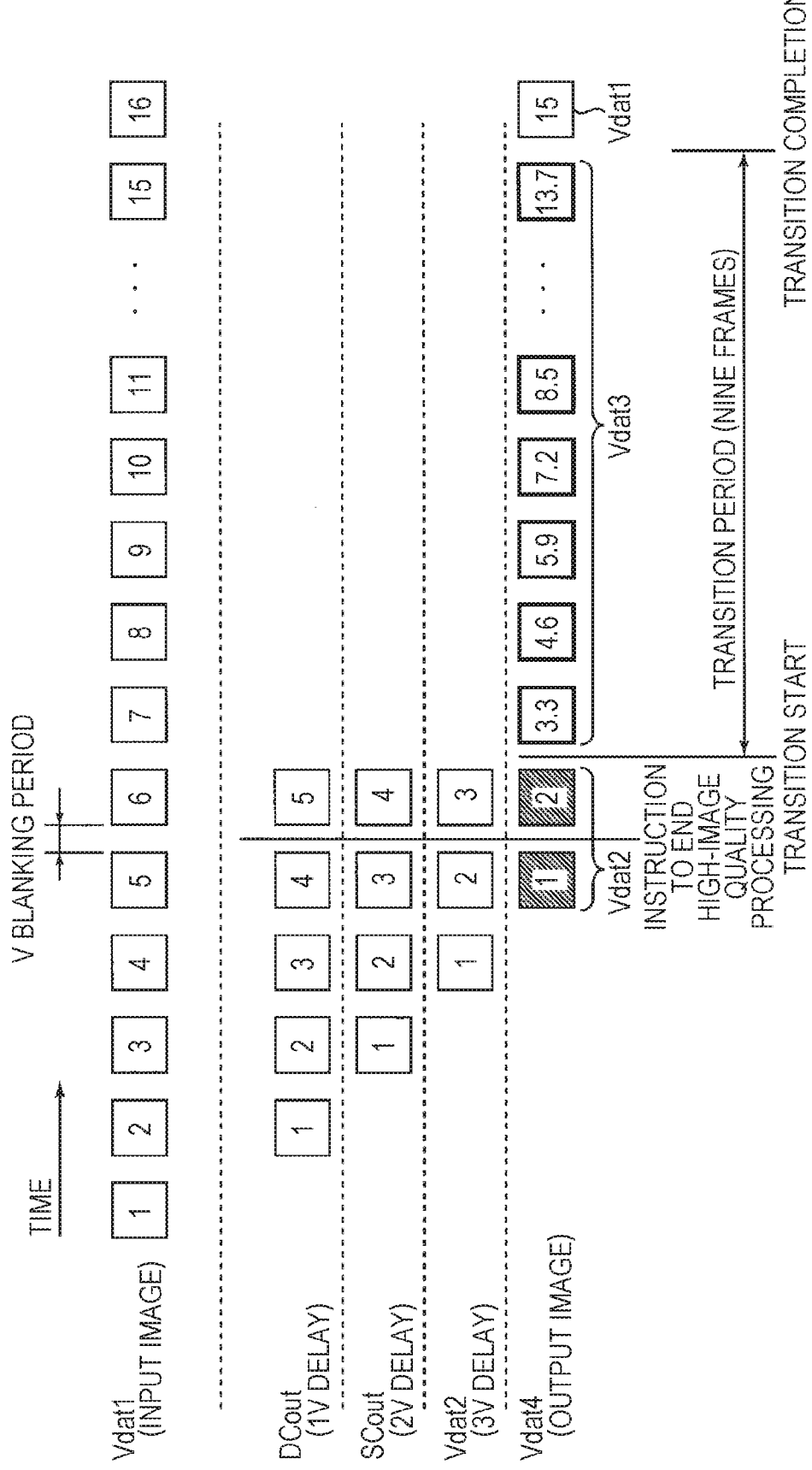
FIG. 9 is a view illustrating an example of the output image when the high-image quality display is changed to the low-image quality display in the first exemplary embodiment.

FIG. 9 is a view illustrating the output image in the case that the high-image quality display (4-frame delay) is changed to the low-image quality display (1-frame delay). FIG. 9 illustrates the case that the low-speed traveling is changed to the high-speed traveling in the V blanking period between frames #5 and #6. In FIG. 9, the transition period has nine frames.

As illustrated in FIG. 9, until frame #6 is input, second image information Vdat2 (4-frame delay) having high-image quality is read and displayed as output image information Vdat4. Since the transition period is set to nine frames, first image information Vdat1 (1-frame delay) having low-image quality, which corresponds to frame #15, is read as output image information Vdat4, and displayed during the input of frame #16 after 10 frames.

The image information about the set interpolation frame, namely, third image information Vdat3 is read and displayed during the input of frames #7 to #15 that is the transition period. Frame #3.3 output during the input of frame #7 is generated during the input of frame #6. For this reason, changing timing and transition starting timing of the high-image quality processing deviate from each other by one frame. For example, the interpolation frame is generated based on the plurality of consecutive frames such that a frame delay amount for the input image decreases gradually. In FIG. 9, frame #3.3 is generated based on the plurality of consecutive frames (for example, frames #2, #3, #4) such that the frame delay amount for frame #7 that is the input image becomes 3.7 frames (7−3.3). The same holds true for frames #4.6, #5.9, #7.2, #8.5, #13.7. That is, in the example of FIG. 9, the interpolation frame is generated based on the plurality of consecutive frames such that the frame delay amount is decremented by 0.3 in the transition period.

The interpolation frame is set in the transition period such that the frame delay amount of the output image decreases gradually from the four frames toward the one frame, so that the high-image quality display of the four frame delays is smoothly changed to the low-image quality display of the one frame delay without damaging the continuity of the frames. Although the long transition period is required as compared with a technique of simply thinning the frame, motion discontinuity of a moving image can be reduced, and the degradation of the quality can be prevented.

On the other hand, when the vehicle speed is less than 80 km/h (NO in step S103 in FIG. 8), the flowchart transitions to the processing in step S109. In step S109, controller 11 determines whether enable signal EN is set to "0", namely, whether high-image quality processor 13 is invalidated. When enable signal EN is set to "0" to invalidate high-image quality processor 13 (YES in step S109), the high-speed traveling is changed to the low-speed traveling. In this case, the flowchart transitions to the processing in step S110 to perform the processing of smoothly changing the output image from the low image quality (1-frame delay) to the high image quality (4-frame delay). When enable signal EN is set to "1" to validate high-image quality processor 13 (NO in step S109), the low-speed traveling is maintained. In this case, the flowchart transitions to the processing in step S102 to continue the display of the output image having high-image quality (second image information Vdat2).

In step S110, controller 11 sets change signal CHG to "1" while setting enable signal EN to "1". Consequently, high-image quality processor 13 is validated, and interpolation frame setting unit 14 is also validated. At this point, similarly to the case that the high image quality is changed to the low image quality, the continuity between the frames is damaged when the output image is instantaneously changed from the low image quality (the 1-frame delay in FIG. 7) to the high image quality (the 4-frame delay in FIG. 6) (see FIGS. 6 and 7). Accordingly, the pieces of processing from step S111 are performed such that the output image is smoothly changed.

In step S111, controller 11 controls interpolation frame setting unit 14 to set the interpolation frame for transitioning to the high image quality (third image information Vdat3). Interpolation frame setting unit 14 sets the interpolation frame displayed in a transition period.

In step S112, controller 11 determines whether the frame interpolation processing for the transition is completed. This determination processing is performed based on whether the previously-set transition period elapses. The setting of the interpolation frame is continued until the frame interpolation processing for the transition is completed. In the transition period, third image information Vdat3 that is image information about the interpolation frame is read as output image information Vdat4, and displayed on display device 20. When the frame interpolation processing is completed (YES in step S112), the flowchart transitions to the processing in step S108.

In step S108, controller 11 sets change signal CHG to "0" to invalidate interpolation frame setting unit 14, and transitions to the processing in step S102. From the subsequent frame, 4-frame delay second image information Vdat2 is read as output image information Vdat4, and the high-image quality image is displayed. Image quality changing processing 1 is repeated until power of electronic mirror device 1A is turned off.

Figure 10:
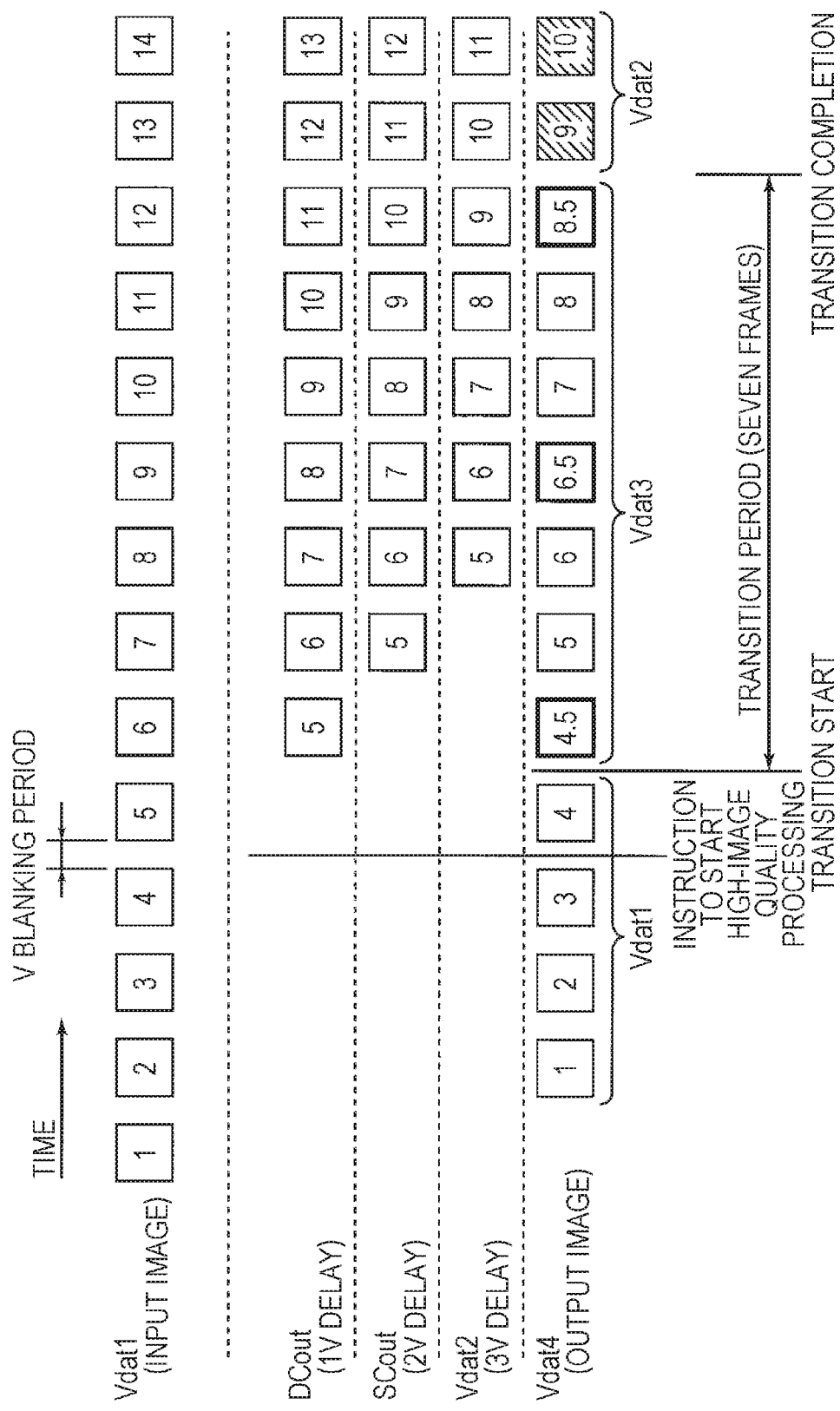
FIG. 10 is a view illustrating an example of the output image when the low-image quality display is changed to the high-image quality display in the first exemplary embodiment.

FIG. 10 is a view illustrating the output image in the case that the low-image quality display (1-frame delay) is changed to the high-image quality display (4-frame delay). FIG. 10 illustrates the case that the high-speed traveling is changed to the low-speed traveling in the V blanking period between frames #4 and #5. In FIG. 10, the transition period has seven frames.

As illustrated in FIG. 10, until frame #5 is input, first image information Vdat1 (1-frame delay) having low-image quality is read and displayed as output image information Vdat4. Frame #4.5 output during the input of frame #6 is generated during the input of frame #5. For this reason, changing timing and transition starting timing of the high-image quality processing deviate from each other by one frame. Since the transition period is set to seven frames, second image information Vdat2 having high image quality (4-frame delay), which corresponds to frame #9, is read as output image information Vdat4, and displayed during the input of frame #13 after eight frames.

The image information about the set interpolation frame, namely, third image information Vdat3 is read and displayed during the input of frames #6 to #12 that is the transition period. The interpolation frame is set such that the frame delay amount increases gradually. In FIG. 9, the interpolation frames (frames #4.5, #6.5. #8.5) that become the output images during the input of frames #6, #9, #12 are generated based on the plurality of consecutive frames. First image information Vdat1 is directly used as the interpolation frames (frames #5, #6, #7, #8) that become the output images during the input of frames #7, #8, #10, #11. In FIG. 10, the output image of frame #4.5 has the delay amount of 1.5 frames, the output image of frame #6.5 has the delay amount of 2.5 frames, and the output image of frame 8.5 has the delay amount of 3.5 frames.

The interpolation frame is set in the transition period such that the frame delay amount of the output image increases gradually from the one frame toward the four frames, so that the low-image quality display of the one frame delay is smoothly changed to the high-image quality display of the four frame delays without damaging the continuity of the frames. Although the long transition period is required as compared with a technique of simply repeating the frame, motion discontinuity of a moving image can be reduced, and the degradation of the quality can be prevented.

As described above, image processing device 10A of the first exemplary embodiment includes frame memory 16 in which the image information is stored on a frame basis, image input unit 12 that receives and stores the image information about the captured image of a surrounding of the traveling vehicle in frame memory 16 as first image information Vdat1 (input image information), high-image quality processor 13 (image quality converter) that converts, on a frame basis, the image quality of first image information Vdat1 stored in frame memory 16, image output unit 15 that reads the image information from frame memory 16 and outputs the image information to display device 20, controller 11 that controls the function of high-image quality processor 13 based on the traveling state of the vehicle and changes the frame delay amount from when each of frames of the image information is received until when the frame is outputted from the image output unit, and interpolation frame setting unit 14 that sets the interpolation frame of the image information to be outputted in the transition period in which controller 11 changes the frame delay amount from a first frame delay amount to a second frame delay amount. Image output unit 15 outputs a frame of first image information Vdat1 or second image information Vdat2 (a frame of the image information having the second frame delay amount) after outputting third image information Vdat3 (the image information about the interpolation frame) in the transition period.

Specifically, controller 11 validates the function of high-image quality processor 13 (image quality converter) in the case that the vehicle speed is less than a predetermined speed (for example, 80 km/h), and invalidates the function of high-image quality processor 13 in the case that the vehicle speed is greater than or equal to the predetermined speed.

In image processing device 10A, the frame delay amount of the output image to the input of the image is changed according to the vehicle speed (an example of the traveling state), so that the driver can accurately recognize the rear situation (such as the approaching situation of the following vehicle) even in the traveling state (for example, the high-speed traveling state) in which the real-time property becomes important. In the case that the image quality (frame delay amount) of the display image is changed, the image quality is not instantaneously changed, but the transition period is provided and the interpolation frame set by interpolation frame setting unit 14 is displayed in the transition period, so that the image quality can smoothly be changed without unnaturally interrupting the image. Thus, the safety is specially improved in the case that image processing device 10A is applied to electronic mirror device 1A and the like for displaying the captured image of a surrounding of the vehicle.

Second Exemplary Embodiment

Figure 11:
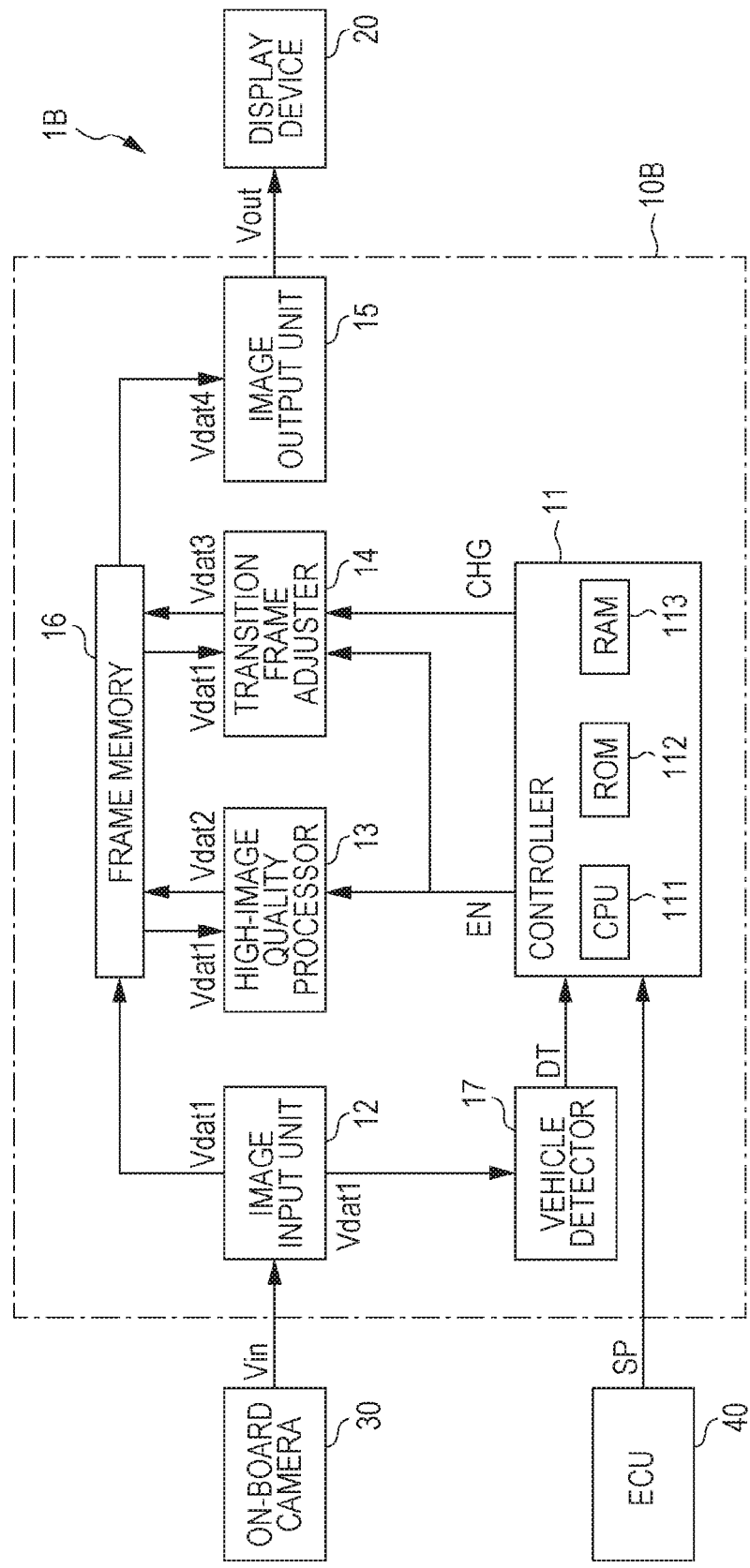
FIG. 11 is a block diagram illustrating an electronic mirror device to which an image processing device according to a second exemplary embodiment is applied.

FIG. 11 is a block diagram illustrating electronic mirror device 1B to which image processing device 10B according to a second exemplary embodiment is applied. Image processing device 10B further includes vehicle detector 17 in addition to the components of image processing device 10A of the first exemplary embodiment (see FIG. 1). Other configurations are similar to those of the first exemplary embodiment, so that only an item relating to vehicle detector 17 will be described.

Image input unit 12 generates and outputs first image information Vdat1 (for example, YUV420) based on input image signal Vin from on-board camera 30. First image information Vdat1 is output to vehicle detector 17 while stored in frame memory 16.

Vehicle detector 17 analyzes first image information Vdat1 from image input unit 12 to determine whether the vehicle (following vehicle) is included in first image information Vdat1. For example, vehicle detector 17 detects the vehicle in the image by template matching. Specifically, vehicle detector 17 produces a histogram distribution map of illuminance information based on first image information Vdat1. The vehicle in the image is detected by comparing the produced histogram distribution to a previously-owned histogram (template) of the vehicle. Vehicle detection information DT indicating a detection result is input to controller 11. Vehicle detection information DT is set to "1" in the case that the vehicle is present in the image, and vehicle detection information DT is set to "0" in the case that the vehicle is absent in the image.

Controller 11 determines the presence or absence of the vehicle based on vehicle detection information DT from vehicle detector 17, and changes the image quality (frame delay amount) only in the case that the vehicle is absent in the image. Specifically, controller 11 performs image changing processing according to a flowchart in FIG. 12.

Figure 12:
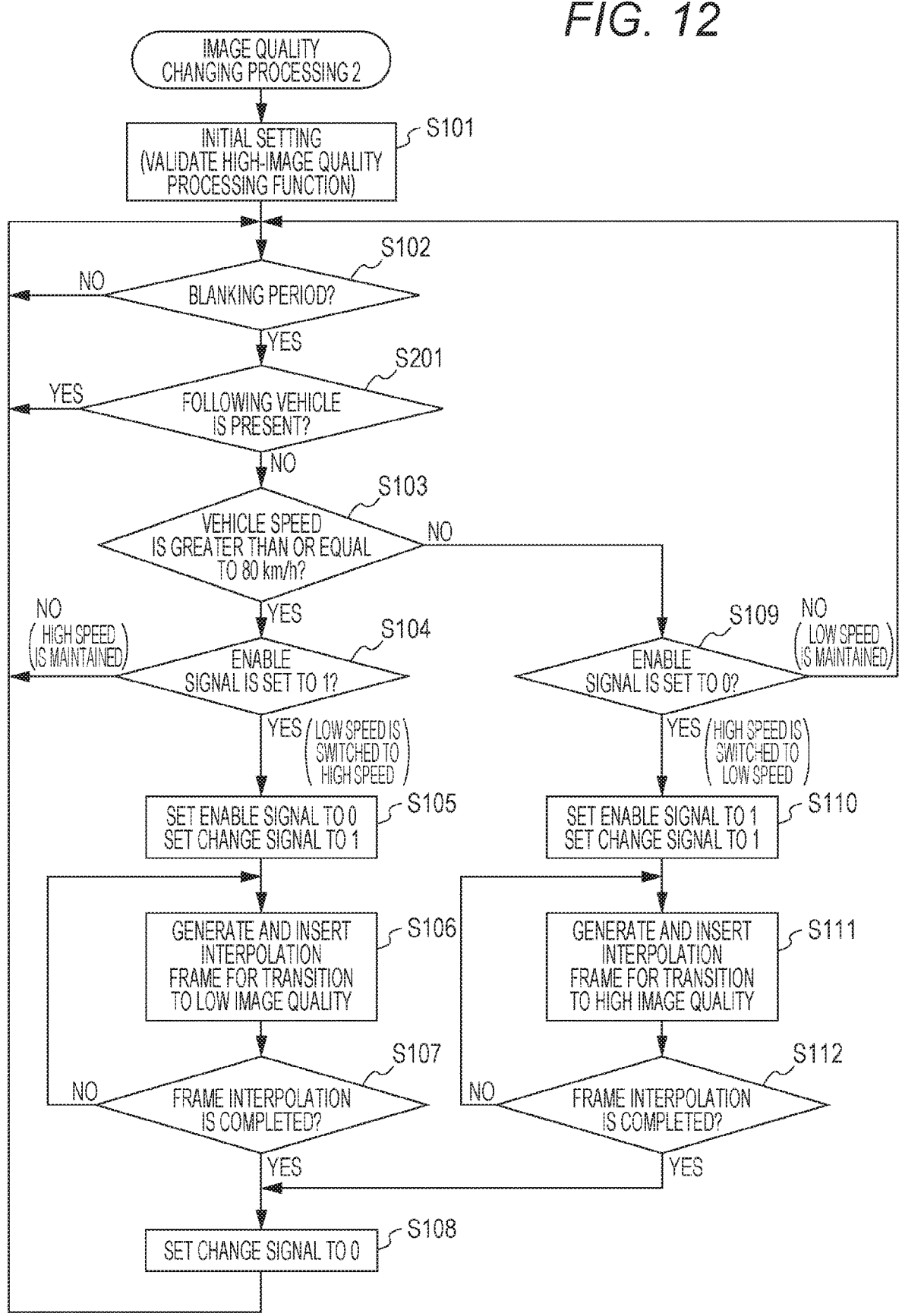
FIG. 12 is a flowchart illustrating an example of the image quality changing processing in the second exemplary embodiment.

FIG. 12 is a flowchart illustrating an example of the image quality changing processing in image processing device 10B. For example, CPU 111 calls the image processing program stored in ROM 112 in association with the activation of electronic mirror device 1B, and executes the image processing program, thereby performing the image quality changing processing. It is assumed that speed information SP is always input from ECU 40 to controller 11.

In the flowchart of FIG. 12, step S201 is added as compared with the flowchart (see FIG. 8) of image quality changing processing 1 of the first exemplary embodiment. In step S201, controller 11 determines whether the following vehicle is present in the image based on vehicle detection information DT. When the following vehicle is present in the image (YES in step S201), the flowchart transitions to the processing in step S102, and waits for the coming blanking period. When the following vehicle is absent in the image (NO in step S201), the flowchart transitions to the processing in step S103, and the image quality changing processing is performed as necessary similarly to the first exemplary embodiment.

Figure 13:
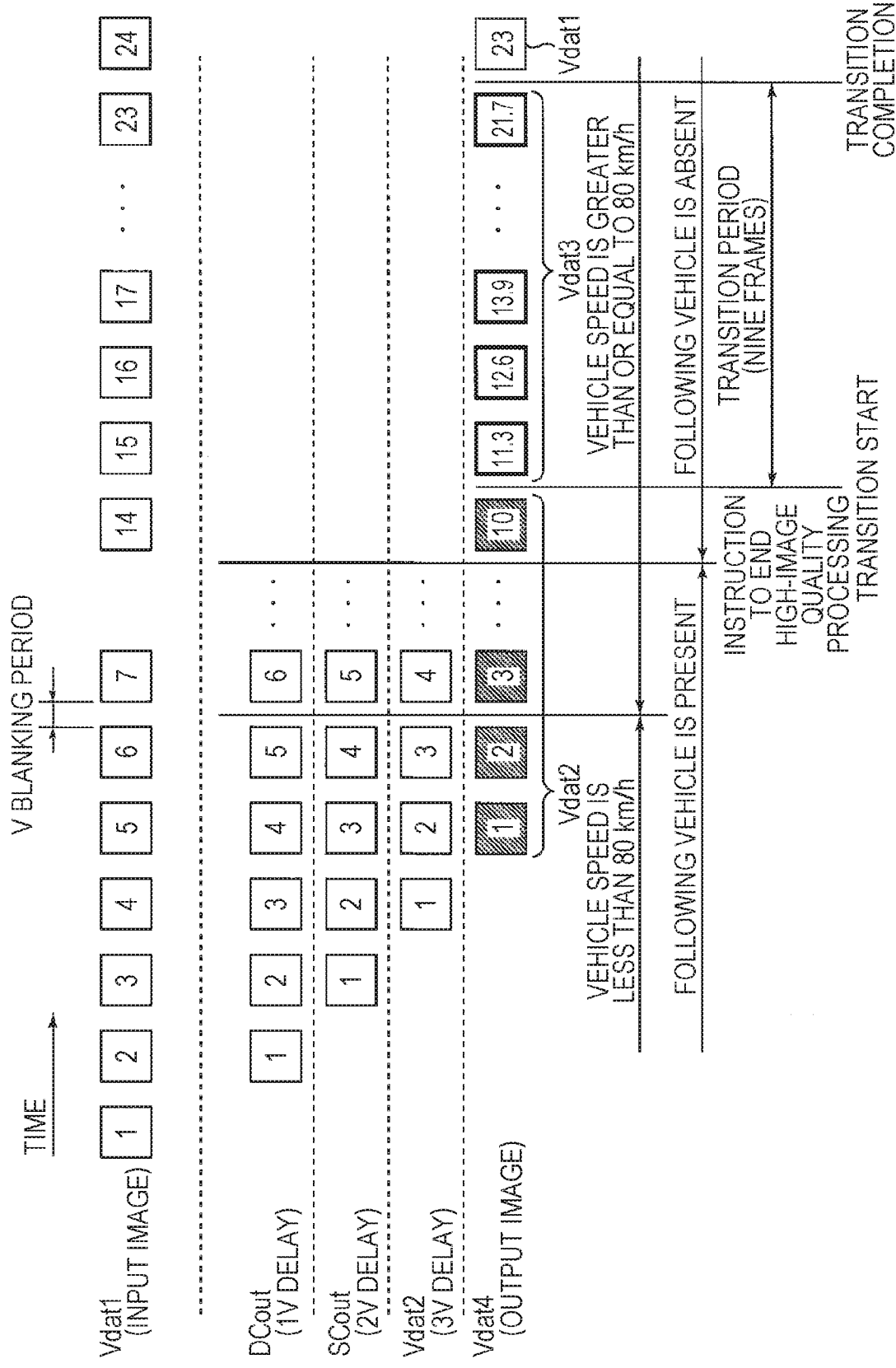
FIG. 13 is a view illustrating an example of the output image when the high-image quality display is changed to the low-image quality display in the second exemplary embodiment.

FIG. 13 is a view illustrating the output image in the case that the high-image quality display (4-frame delay) is changed to the low-image quality display (1-frame delay). As illustrated in FIG. 13, the low-speed traveling is changed to the high-speed traveling in the V blanking period between frames #6 and #7, but the image quality changing processing is not performed because the following vehicle is present in the image in this timing. When the following vehicle is absent in the image in the V blanking period between frames #13 and #14, the image quality changing processing (the pieces of processing from step S103 in FIG. 12) is performed.

That is, in the second exemplary embodiment, even if the low-speed traveling is changed to the high-speed traveling, the image quality is not instantaneously changed when the following vehicle is present in the image, but the image quality is changed after the following vehicle is absent.

The presence or absence of the vehicle may directly be detected using an infrared sensor, a radar, or an ultrasonic sensor instead of vehicle detector 17 that detects the vehicle based on the image information.

In this way, image processing device 10B of the second exemplary embodiment further includes vehicle detector 17 that detects the presence or absence of the vehicle in the image based on input image information Vdat1 in addition to image processing device 10A of the first exemplary embodiment. Controller 11 changes the frame delay amount based on the detection result of vehicle detector 17, specifically, in the case that the vehicle is detected to be absent in the image, or in the case that the vehicle is detected to be absent within a given distance from the own vehicle.

The driver who is sensitive to the change in image quality possibly feels strange to a slight change in image quality. When the image quality changing processing is performed in a nervous situation in which the following vehicle travels around the own vehicle, a visual line of such the driver is wrested by the image, and there is a risk of damaging the safety. In image processing device 10B, the image quality changing processing is performed only in the situation in which the following vehicle is absent around the own vehicle, so that the problem can be avoided.

In the second exemplary embodiment, even if the following vehicle travels around the own vehicle, the image quality changing processing may be performed in the case that a distance to the own vehicle is greater than or equal to a given distance (for example, at least 100 m), or in the case that the distance to the own vehicle is not change for a given time (for example, at least five seconds). In the case that the following vehicle always travels around the own vehicle because of heavy traffic, the image quality changing processing is not performed even if the vehicle speed changes, so that the image quality changing processing may be performed in timing of decreasing a number of surrounding vehicles (for example, timing in which the number of following vehicles becomes one).

It is also said that such a change in brightness of a surrounding of the vehicle that the own vehicle enters a tunnel or an underground parking lot is the nervous situation. Thus, the image quality changing processing is not performed immediately after the brightness of a surrounding of the vehicle changes, but the image quality changing processing may be started after the brightness returns to original brightness, or in the case that the brightness does not change for a given time. For example, the change in brightness of a surrounding of the vehicle can be detected by monitoring average luminance of first image information Vdat1. For example, an illuminance sensor mounted on the vehicle or an illumination signal of the vehicle can also be used to detect the change in brightness of a surrounding of the vehicle.

Although the invention made by the present inventor has been specifically described above based on the exemplary embodiments, the present invention is not limited to the above exemplary embodiments, but can be modified without departing from the gist of the present invention.

Figure 14:
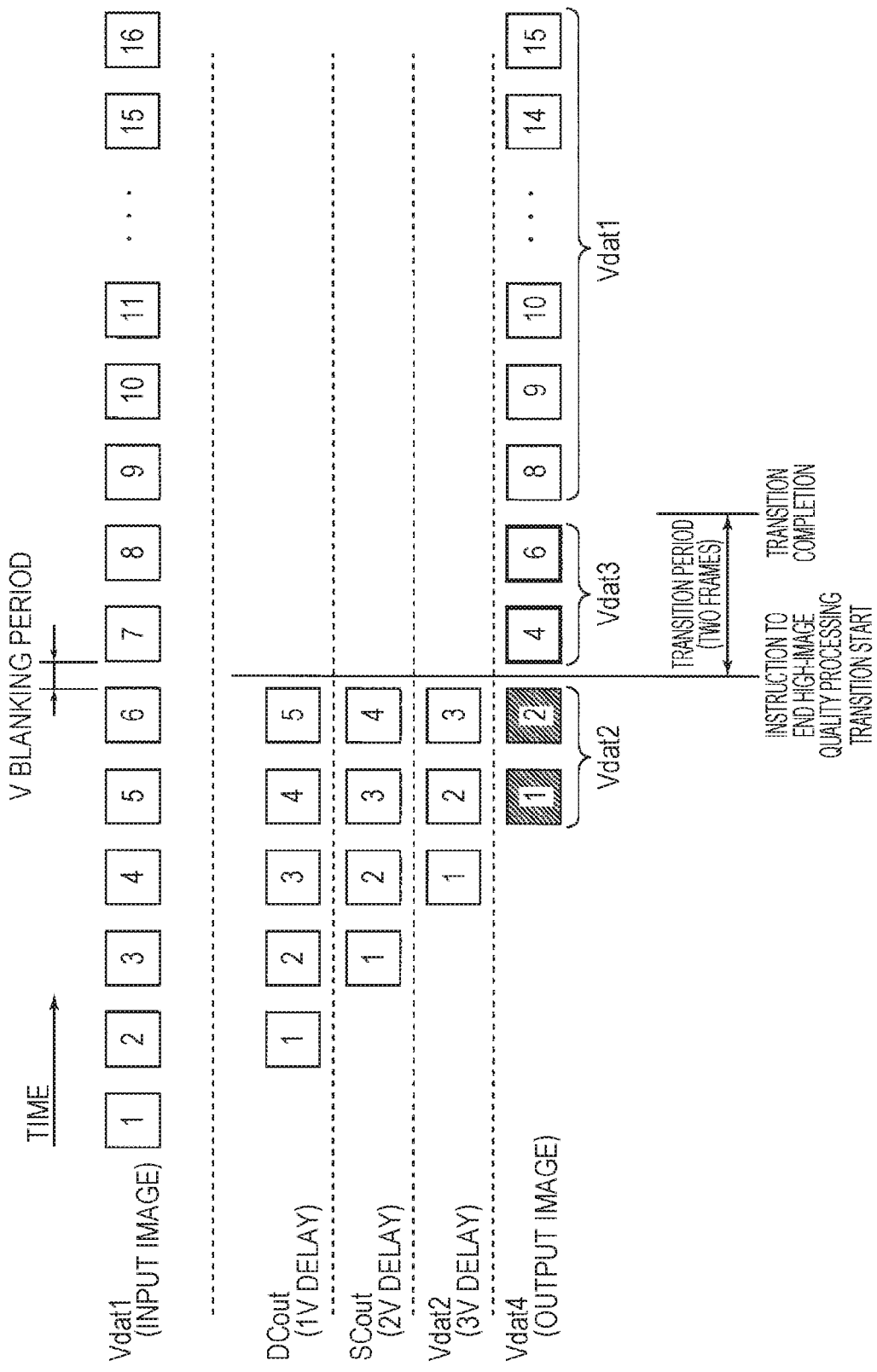
FIG. 14 is a view illustrating another example of the output image when the high-image quality display is changed to the low-image quality display.
Figure 15:
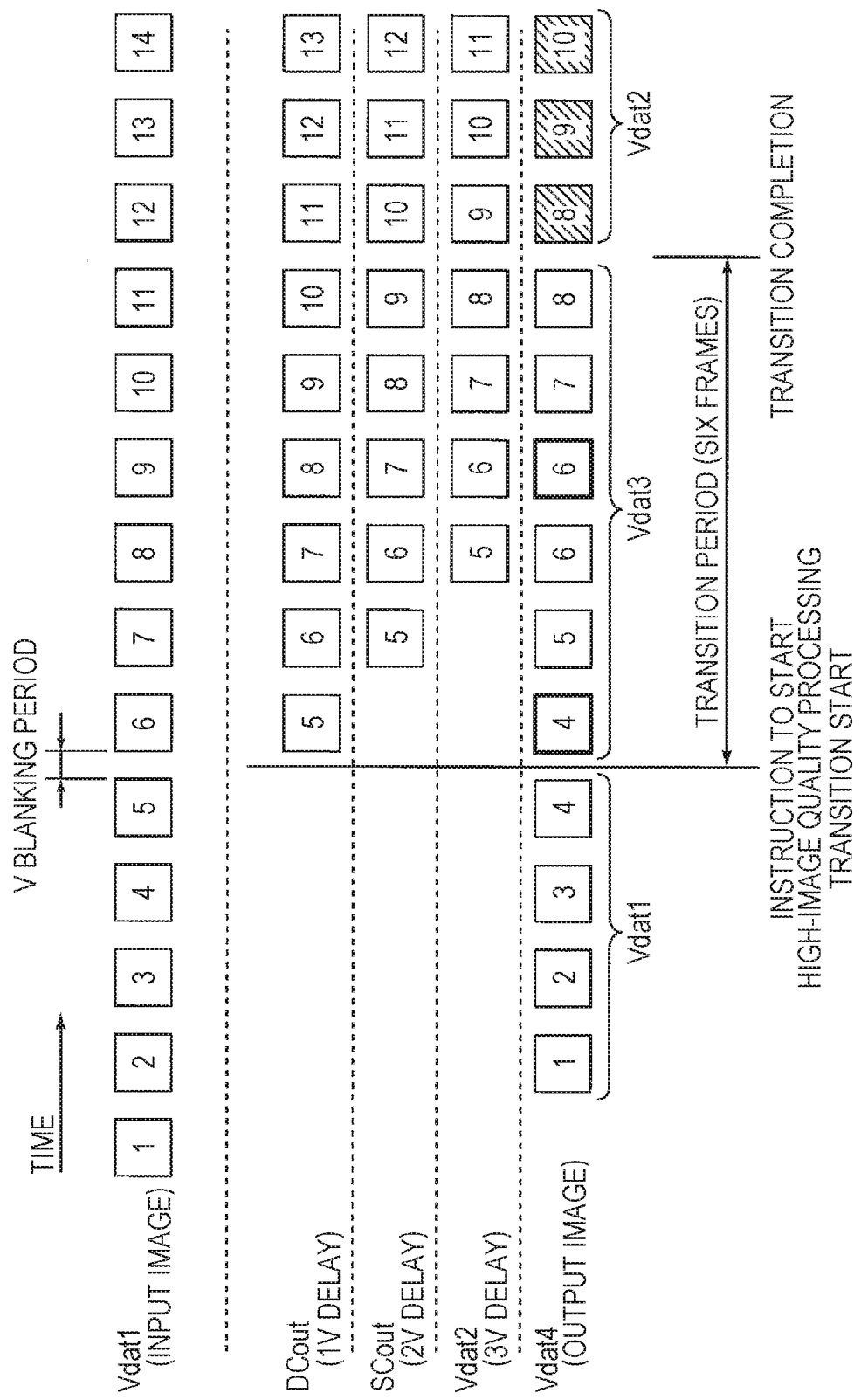
FIG. 15 is a view illustrating another example of the output image when the low-image quality display is changed to the high-image quality display.

For example, in the above exemplary embodiments, interpolation frame setting unit 14 may reproduce first image information Vdat1 stored in frame memory 16, and set first image information Vdat1 as the interpolation frame. For example, as illustrated in FIG. 14, in the case that the high-image quality display is changed to the low-image quality display, frames #4, #6 may be set as the interpolation frame, and frames #3, #5 may simply be skipped. In this case, as compared with the case that the interpolation frame is newly generated and set (see FIG. 9), the transition starting timing becomes earlier (identical to changing instruction timing), and the image quality changing processing can be completed in a short time. For example, as illustrated in FIG. 15, in the case that the low-image quality display is changed to the high-image quality display, because the frame delay amount increases gradually, the interpolation frame is not newly generated, but frames #4, #6 may be repeated. In this case, as compared with the case that the interpolation frame is newly generated and set (see FIG. 10), the transition starting timing becomes earlier (identical to changing instruction timing), and a processing load on interpolation frame setting unit 14 can be reduced.

For example, in the above exemplary embodiments, the image quality changing processing is performed in two stages of the case that the vehicle speed is greater than or equal to 80 km/h and the case that the vehicle speed is less than 80 km/h. Alternatively, a plurality of predetermined speeds that become a threshold are provided, and the image quality changing processing may be performed in at least three stages.

Not the actual vehicle speed but traveling information acquired from a car navigation system and the like is used as the traveling state of the vehicle, whether the own vehicle travels on an expressway is determined, and the image quality changing processing may be performed in entering and departing from the expressway.

It should be construed that the exemplary embodiments disclosed herein are illustrative in all aspects, and is not restrictive. The scope of the present invention is represented by the scope of the claims and not by the above description, and it is intended that all modifications within the sense and scope equivalent to the claims are involved in the scope of the present invention.

INDUSTRIAL APPLICABILITY

The present invention is suitable for an on-board image processing device applied to an electronic mirror device and the like for displaying a captured image around a vehicle.

REFERENCE MARKS IN THE DRAWINGS 1A, 1B: electronic mirror device
10A, 10B: image processing device
11: controller
12: image input unit
13: high-image quality processor (image quality converter)
14: interpolation frame setting unit
15: image output unit
16: frame memory
17: vehicle detector
20: display device
30: on-board camera
40: ECU

The invention claimed is:

1. An image processing device comprising:
a frame memory in which image information is stored on a frame basis;
at least one processor; and
at least one memory coupled to the at least one processor, the at least one memory storing at least one program that, when executed by the at least one processor, causes the image processing device to:
receive and store the image information about a captured image of a surrounding of a traveling vehicle in the frame memory;
convert, on the frame basis, an image quality of the image information stored in the frame memory;
read the image information from the frame memory and output the image information to a display device;
control a conversion of the image quality of the image information based on a traveling state of the vehicle and change a frame delay amount from when each of frames of the image information is received until when each of the frames is output;
set an interpolation frame of the image information to be output in a transition period and change the frame delay amount from a first frame delay amount to a second frame delay amount in the transition period; and
output a frame of the image information having the second frame delay amount after outputting the image information about the interpolation frame in the transition period.

2. The image processing device according to claim 1, wherein the at least one program causes the image processing device to convert the image quality of the image information when a vehicle speed of the vehicle is less than a predetermined speed, and to not convert the image quality of the image information when the vehicle speed of the vehicle is greater than or equal to the predetermined speed.

3. The image processing device according to claim 1, wherein the at least one program causes the image processing device to newly generate a frame based on the image information stored in the frame memory, and to set the frame as the interpolation frame.

4. The image processing device according to claim 3, wherein the at least one program causes the image processing device to set the interpolation frame such that the frame delay amount changes stepwise from the first frame delay amount to the second frame delay amount.

5. The image processing device according to claim 1, wherein the at least one program causes the image processing device to reproduce a frame of the image information stored in the frame memory, and to set the reproduced frame as the interpolation frame.

6. The image processing device according to claim 1, wherein the at least one program causes the image processing device to detect whether any other vehicle is in the captured image based on the image information stored in the frame memory and to change the frame delay amount based on a detection result.

7. The image processing device according to claim 6, wherein the at least one program causes the image processing device to at least one of change the frame delay amount when no other vehicle is detected in the captured image, or change the frame delay amount when no other vehicle is detected within a given distance from the vehicle.

* * * * *